United States Patent [19]
Mlynek

[11] Patent Number: 4,464,729
[45] Date of Patent: Aug. 7, 1984

[54] BINARY MOS CARRY-LOOK-AHEAD PARALLEL ADDER

[75] Inventor: Daniel Mlynek, Wolfgantzen, France
[73] Assignee: ITT Industries, Inc., New York, N.Y.
[21] Appl. No.: 311,351
[22] Filed: Oct. 14, 1981

[30] Foreign Application Priority Data

Nov. 15, 1980 [EP] European Pat. Off. ........ 80107091.3

[51] Int. Cl.³ .............................................. G06F 7/50
[52] U.S. Cl. .................................................. 364/787
[58] Field of Search ........................................ 364/787

[56] References Cited

U.S. PATENT DOCUMENTS

| | | | |
|---|---|---|---|
| 3,202,806 | 8/1965 | Menne | 364/787 |
| 3,681,584 | 8/1972 | Wolf | 364/787 |
| 3,728,532 | 4/1973 | Pryor | 364/787 |
| 3,925,652 | 12/1975 | Miller | 364/787 |
| 4,163,211 | 7/1979 | Miura | 364/787 X |

OTHER PUBLICATIONS

Schmookler et al., "Group-Carry Generator", *IBM Tech. Disclosure Bulletin*, vol. 6, No. 1, Jun. 1963, pp. 77–78.

*Primary Examiner*—David H. Malzahn
*Attorney, Agent, or Firm*—Donald J. Lenkszus

[57] ABSTRACT

Unlike prior art parallel adders, which employ conventional EXCLUSIVE-OR gates, the parallel adder disclosed uses special EXCLUSIVE-NOR gates constructed from only three transistors, so that a considerable space-saving and a reduction of power dissipation are achieved on the integrated-circuit chip. Instead of noninverted digit signals, inverted digit signals are used to form the E and D signals which are combined by means of a complex gate for each binary weight to form the inverted carry signal of this weight. This complex gate includes a number of AND elements equal to the number of the stage, and a NOR element combining the outputs of these AND elements and the D signal of this stage. The inverted carry signal of a stage and the inverted subtotal signal of the next higher-order stage are combined by means of an EXCLUSIVE-NOR gate of the above-mentioned special circuit construction to form the noninverted sum signal of the next higher order stage. The inverted subtotal signal of each stage is also provided by an EXCLUSIVE-NOR gate of the above-mentioned special circuit construction combining the E and D signals of that stage.

6 Claims, 2 Drawing Figures

4,464,729

BINARY MOS CARRY-LOOK-AHEAD PARALLEL ADDER

BACKGROUND OF THE INVENTION

The present invention relates to binary MOS carry-look-ahead parallel adders which are integrated using enhancement-mode insulated-gate field-effect transistors of the same conductivity type (N- or P-channel) and with which two numbers represented in the n-digit binary code can be added, the carry signal of each digit position being formed by carry look-ahead.

Parallel adders of this kind are described in a book by A. Shah et al, "Inegrierte Schaltungen In Digitalen Systemen", Vol. 2, Basel, 1977, pages 94 to 103. According to the formulas given on pages 94 and 95, the logic equation for the formation of the k-th carry signal Ck is:

$$C_k = D_k + E_k D_j + E_k E_j D_i + \ldots + E_k E_j E_i \ldots E_1 D_0 + E_k E_j E_i \ldots E_1 E_0 C(-1),$$

with the following relation holding for the indices i, j, k:

$$k = j+1 = i+2 = \ldots$$

For the D and E signals the following equations hold:

$$D_k = A_k \cdot B_k,$$

where the dot means logic AND, and $$E_k = A_k + B_k,$$

where the plus sign means logic OR.

Furthermore, an S'k signal to be regarded as a subtotal signal, is defined as follows:

$$S'_k = A_k \oplus B_k = \overline{D_k} \cdot E_k,$$

where the encircled plus sign means modulo-2 addition, i.e., EXCLUSIVE-OR. Finally the following logic equation holds for the sum signal Sk of each binary digit:

$$S_k = S'_k \oplus C_j,$$

i.e., the sum signal of the k-th digit position is obtained by forming the EXCLUSIVE-OR of the subtotal signal S'k of this digit with the carry signal of the next lower-order position.

FIG. IX.7 on page 96 of the above reference shows the logic diagram of a parallel adder for two four-digit binary numbers which is constructed on these principles. Four logic gates are connected in series with respect to the signal flow between the inputs for the individual digit signals Ak, Bk and the corresponding outputs for the sum signals Sk. The term "gate" is understood here to be a logic element which has a load of its own.

Page 97 of the above-mentioned book contains information on bipolar integrated circuits constructed in accordance with FIG. IX.7 of page 96 and on commercially available bipolar integrated circuits. Direct application of the fundamental principles of conventional carry-look-ahead parallel adders, which are explained there with reference to bipolar integrated circuits, to integrated circuits using insulated-gate field-effect transistors, i.e., to so-called MOS circuits, is not readily possible because MOS technology differs widely from bipolar technology in some respects.

SUMMARY OF THE INVENTION

An object of the present invention is to provide an MOS carry-look-ahead parallel adder which is simpler in construction than would be the case if the principles of conventional bipolar circuits were applied directly and schematically to MOS circuits.

In particular, fewer logic gates, i.e., gates having a load of their own, are connected in series with respect to the signal flow between input and output. Furthermore, the arrangement is to be such that the circuit has as few MOS transistors as possible per binary digit to be processed.

Therefore, another object of the present invention is to provide an MOS carry-look-ahead parallel adder which operates as fast as possible and has the lowest cost possible.

A feature of the present invention is the provision of a monolithic integrated binary MOS carry-look-ahead parallel adder for adding two numbers each represented in an n-digit binary code, where n is an integer greater than one comprising: n stages, one for each of the n digit signals of the two numbers, each of the n stages including a NOR gate to combine associated inverted digit signals of the two numbers to provide a D signal, a NAND gate to combine associated inverted digit signals of the two numbers to provide an E signal, a first EXCLUSIVE-NOR gate coupled to the NOR gate and the NAND gate responsive to the D and E signals to provide an inverted subtotal signal, and a second EXCLUSIVE-NOR gate coupled to the first EXCLUSIVE-NOR gate and to the next lower weight stage of the n stages responsive to the inverted subtotal signal and an inverted carry signal of the next lower weight stage to provide a digit sum signal.

The principal advantages of the present invention are that only three logic gates per binary digit are connected in series with respect to the signal flow, so that the speed of the parallel adder according to the present invention is given by the triple gate delay. Compared to the prior art arrangements, a considerable space saving and reduction of power dissipation are achieved on the semiconductor body of the integrated parallel adder by the use of the novel EXCLUSIVE-NOR gate having only three transistors. Compared with the prior art arrangement, in which the subtotal signal is formed by an AND gate preceded by an inverter, part of the reduction in area and part of the increase in speed result from the replacement of the AND gate by the first EXCLUSIVE-NOR gate according to the present invention.

BRIEF DESCRIPTION OF DRAWING

Above-mentioned and other features an objects of this invention will become more apparent by reference to the following description taken in conjunction with the accompanying drawing, in which.

DESCRIPTION OF THE PREFERRED EMBODIMENT

Figure 1:
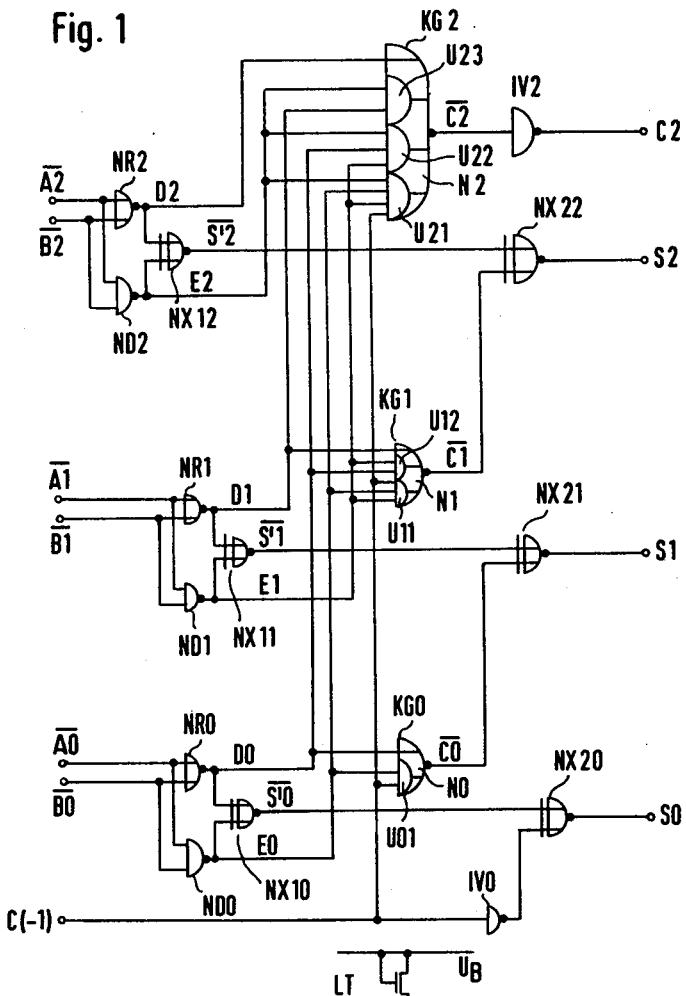
FIG. 1 is a schematic logic diagram of an embodiment of binary MOS carry-look-ahead parallel adder in accordance with the principles of the present invention for two three-digit binary numbers to be added, with an additional carry input.

The logic circuit diagram of FIG. 1 shows an embodiment of a parallel adder for the two three-digit binary numbers A and B. NOR gates NR0, NR1, and NR2 and associated NAND gates ND0, ND1, and ND2 each having two inputs, are provided for the three binary digits with the binary weights 0, 1 and 2, respectively. They are fed with the inverted digit signals $\overline{A0}$, $\overline{B0}$; $\overline{A1}$, $\overline{B1}$; $\overline{A2}$, $\overline{B2}$. The outputs of the NOR gates provide the D signals D0, D1, D2, and the outputs of the NAND gates provide the E signals E0, E1, E2. According to the present invention, unlike in the prior art, where an EXCLUSIVE-OR gate forms the corresponding subtotal S' signal, the corresponding inverted subtotal signals, i.e., the $\overline{S}'$ signals $\overline{S'0}$, $\overline{S'1}$, $\overline{S'2}$, are formed by means of the first EXCLUSIVE-NOR gates NX10, NX11, NX12.

By means of the complex gates KG0, KG1, KG2, each of which feeds a single load resistor, the inverted carry signals $\overline{C0}$, $\overline{C1}$, $\overline{C2}$ are formed from the D and E signals and from any carry signal having an even lower weight than that from the lowest-order stage.

The respective inverted subtotal signal $\overline{S}'$ is combined with the inverted carry signal C of the next lower-order stage in the second EXCLUSIVE-NOR gates NX20, NX21, NX22, whose outputs provide the digit sum signals S0, S1, S2. The least significant weight second EXCLUSIVE-NOR gate NX20 is fed through an inverter IV0 with the carry signal C(−1) from any stage having an even lower weight.

The complex gate in each stage includes as many AND elements as is indicated by the number of the stage, i.e., the complex gate KG0 of the first stage, assigned to the binary digits with the weight 0, contains one AND element U01; the complex gate KG1 in the second stage, assigned to the binary digits with the weight 1, contains two AND elements U11, U12; and the complex gate KG2 in the third stage, assigned to the weight 2, contains three AND elements U21, U22, U23.

An embodiment for processing four-, five- or six-digit binary numbers would then comprise corresponding complex gates in the fourth, fifth or sixth stage with four, five or six AND elements, respectively.

In the embodiment of FIG. 1, the AND element U01 of the complex gate KG0 has two inputs which are presented with the carry signal C(−1) and the E signal E0. The first AND element U11 in the complex gate KG1 of the next higher-order stage has one inut more, to which the E signal E1 of this stage is applied, while the other two inputs are each connected to a different one of the two inputs of the AND element U01 of the complex gate KG0. The first AND element U21 in the complex gate KG2 again has one input more, which is fed with the E signal E2 of this stage, while the other three inputs are each connected to a different one of the three inputs of the first AND element U11 of the complex gate KG1. The first AND element in each complex gate KG thus has one input more than that in the complex gate in the next lower-order stage, and this additional input is presented with the E signal of this stage.

The second AND element U12 of the complex gate KG1 has two inputs, one of which is fed with the E signal E1 of this stage, while the other is supplied with the D signal D0 of the next lower-order stage. The second AND element U22 of the complex gate KG2 has a third input, which is presented with the E signal E2 of this stage, while the two other inputs are connected in parallel with the two inputs of the second AND element U12 of the complex gate KG1. Correspondingly, each second AND element in further complex gates has one input more, which is fed with the E signal of this stage, while the others are connected in parallel with the inputs of the second AND element of the next lower-order stage.

The third AND element U23 of the complex gate KG2 has two inputs, one of which is fed with the E signal E2 of this stage, while the other is presented with the D signal D1 of the next lower-order stage. Accordingly, in the conceivable complex gate of the next-higher order stage, the third AND element has an additional input for the E signal of this stage, and the other two inputs are connected in parallel to the two inputs of AND element 23. Then an additional AND element having two inputs for the E signal of this stage and for the D signal of the next lower-order stage must be provided. The periodicity of the respective complex gate thus follows automatically.

Each of the complex gates described includes an associated NOR element N0, N1, N2, which NORs the outputs of the existing AND elements and the D signal D1, D2, D3 of the respective stage. The output of the respective complex gate KG0, KG1, KG2 provides the respective inverted carry signal $\overline{C0}$, $\overline{C1}$, $\overline{C2}$. If the carry signal from the highest-order stage is to be available in non-inverted form, the output of the complex gate KG2 must be followed by an inverter IV2.

Figure 2:
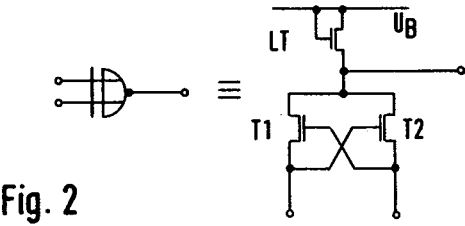
FIG. 2 is a circuit diagram of the EXCLUSIVE-NOR gate of FIG. 1, which is constructed from only three transistors.

FIG. 2 shows the special internal circuit of the first and second EXCLUSIVE-NOR gates according to the present invention. The EXCLUSIVE-NOR gates includes only three transistors, namely the load transistor LT and the two transistors T1 and T2, which are cross-coupled like in a memory cell. The load transistor LT is connected as a resistance since its gate is connected to the supply voltage $U_B$. The load transistor shown in FIG. 2 is an enhancement-mode transistor, but it is also possible and may be particularly advantageous to use a depletion-mode transistor. In that case, its gate must be connected to the node of the two transistors T1 and T2, which is the signal output.

One end of the controlled current paths of the two transistors T1 and T2 is connected to the load transistor LT and, hence, to the above-mentioned output, and the other end is used as the respective signal input. The gate of the transistor T1 is connected to the signal input of the transistor T2, whose gate is connected to the signal input of the transistor T1. The real dimensions of the load transistor Lt and the two transistors T1, T2 must be determined by the conventional ratio technique as usual.

The principle of the present invention, which includes particularly in the use of the first and second EXCLUSIVE-NOR gates in conjunction with the "inverting" complex gates, is also applicable to multi-level carry-look-ahead parallel adders as are described in the above-mentioned book on pages 98 to 103.

While I have described above the principles of my invention in connection with specified apparatus it is to be clearly understood that this description is made only by way of example and not as a limitation to the scope of my invention as set forth in the objects thereof and in the accompanying claims.

I claim:

1. A monolithic integrated binary MOS carry-look-ahead parallel adder for adding two numbers each represented in an n-digit binary code, where n is an integer greater than one comprising:

n stages, one for each of the n digit signals of said two numbers, each of said n stages including
a NOR gate to combine associated inverted digit signals of said two numbers to provide a D signal,
a NAND gate to combine associated inverted digit signals of said two number to provide an E signal,
a first EXCLUSIVE-NOR gate having a first input coupled to said NOR gate a second input coupled to said NAND gate and responsive to said D and E signals to provide an inverted subtotal signal, at an output and a second EXCLUSIVE-NOR gate having a first input coupled to said first EXCLUSIVE-NOR gate output and having a second input coupleable to the next lower weight stage of said n stages where there is a lower weight stage and responsive to said inverted subtotal signal and for stages other than the lowest weight stage an inverted carry signal of said next lower weight stage to provide a digit sum signal.

2. A parallel adder according to claim 1, wherein each of said n stages further includes a complex gate feeding a single load to provide said inverted carry signal, said complex gate having a number of AND elements said number being dependent on the weight of the stage containing said complex logic gate, each of said AND elements having inputs selectively receiving predetermined ones of said D and E signals of said stage containing said complex logic gate and all lower weighted stages, and a NOR element having a first input for receiving said D signal from said stage containing said complex logic gate and other inputs coupled to the output of said AND gates of said stage containing said complex logic gate to combine the outputs thereof.

3. A parallel adder according to claims 1 or 2, wherein
each of said first and second EXCLUSIVE-NOR gates include
two transistors, one of said two transistors having its gate connected to a signal input of the other of said two transistors which has its gate connected to a signal input of said one of said two transistors, and
a load transistor connected as a resistor between a supply voltage and the common output of said two transistors.

4. A parallel adder according to claim 3, wherein enhancement-mode insulated-gate field-effect transistors of the same conductivity type are employed in each of said n stages.

5. A parallel adder according to claim 4, wherein said load transistors are depletion-mode transistors.

6. A parallel adder according to claims 1 or 2, wherein
enhancement-mode insulated-gate field-effect transistors of the same conductivity type are employed in each of said n stages.

* * * * *